July 10, 1962 W. J. LAYCOX 3,042,966
APPARATUS FOR RETREADING TIRES
Filed Sept. 11, 1959 5 Sheets-Sheet 1

INVENTOR
William Jack Laycox

ATTORNEYS

July 10, 1962  W. J. LAYCOX  3,042,966
APPARATUS FOR RETREADING TIRES
Filed Sept. 11, 1959  5 Sheets-Sheet 2

INVENTOR
*William Jack Laycox*

ATTORNEYS

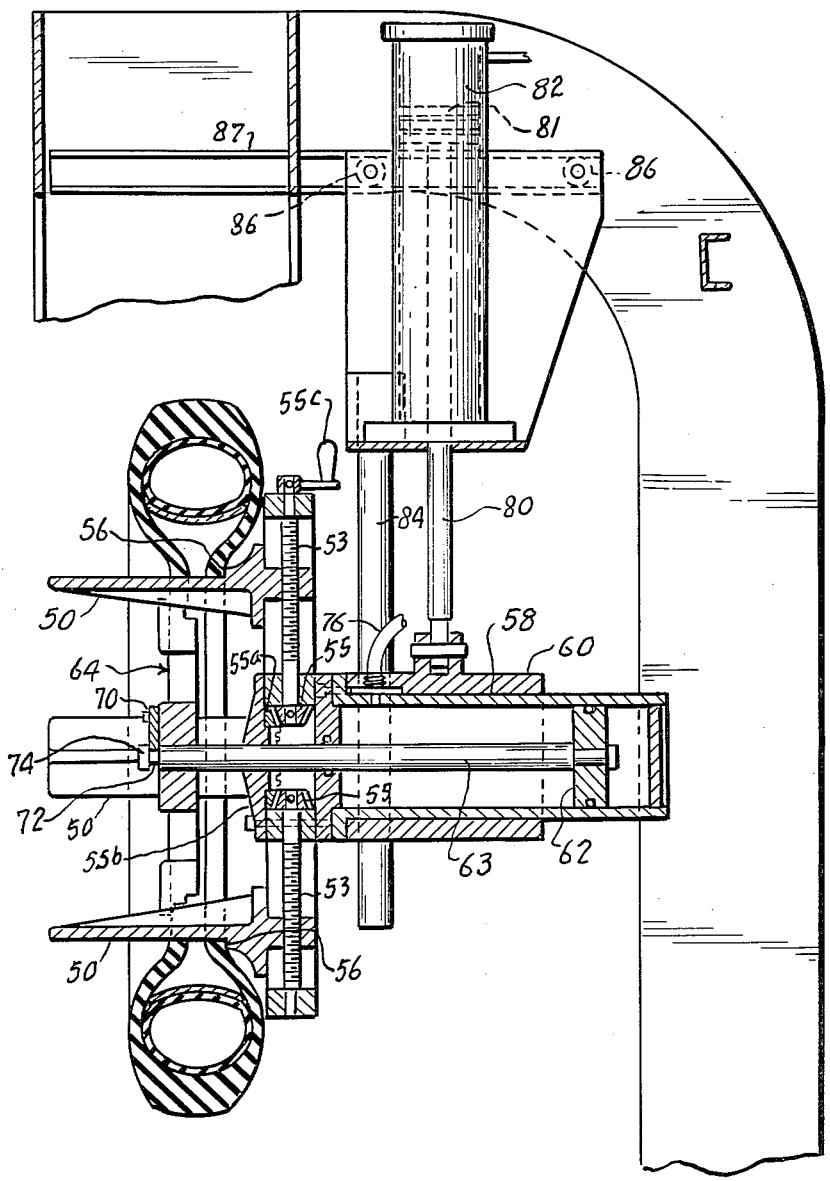

July 10, 1962 W. J. LAYCOX 3,042,966
APPARATUS FOR RETREADING TIRES
Filed Sept. 11, 1959 5 Sheets-Sheet 4
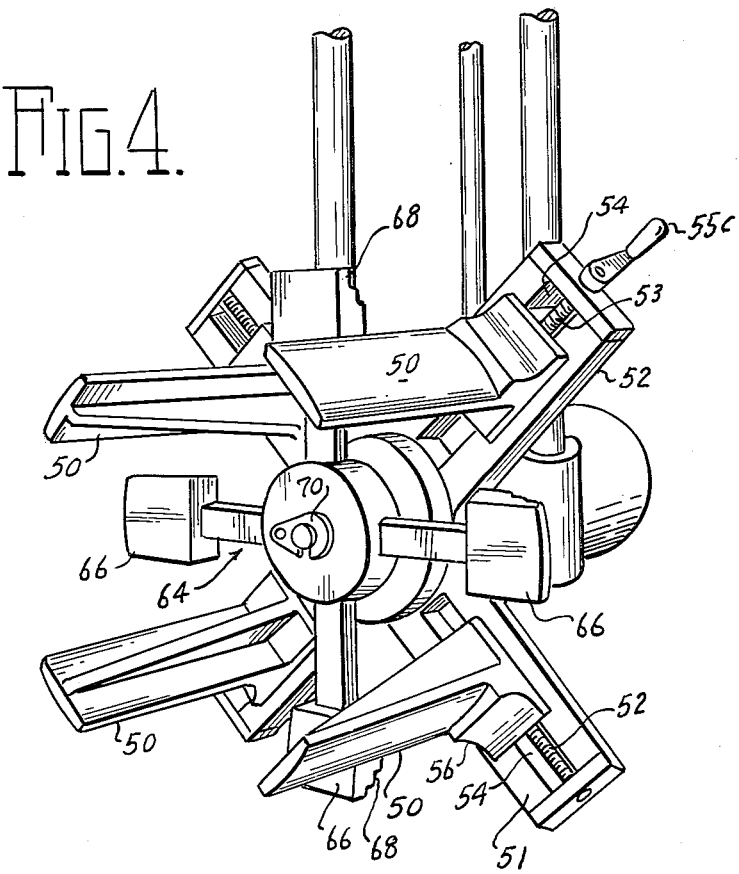
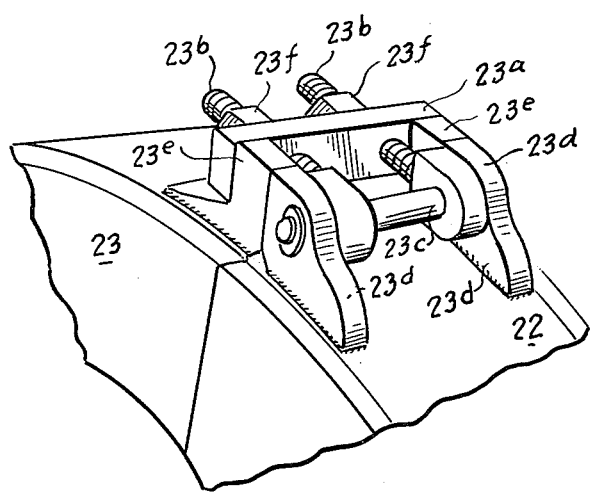
INVENTOR.
William Jack Laycox
BY
ATTORNEYS July 10, 1962 W. J. LAYCOX 3,042,966
APPARATUS FOR RETREADING TIRES
Filed Sept. 11, 1959 5 Sheets-Sheet 5
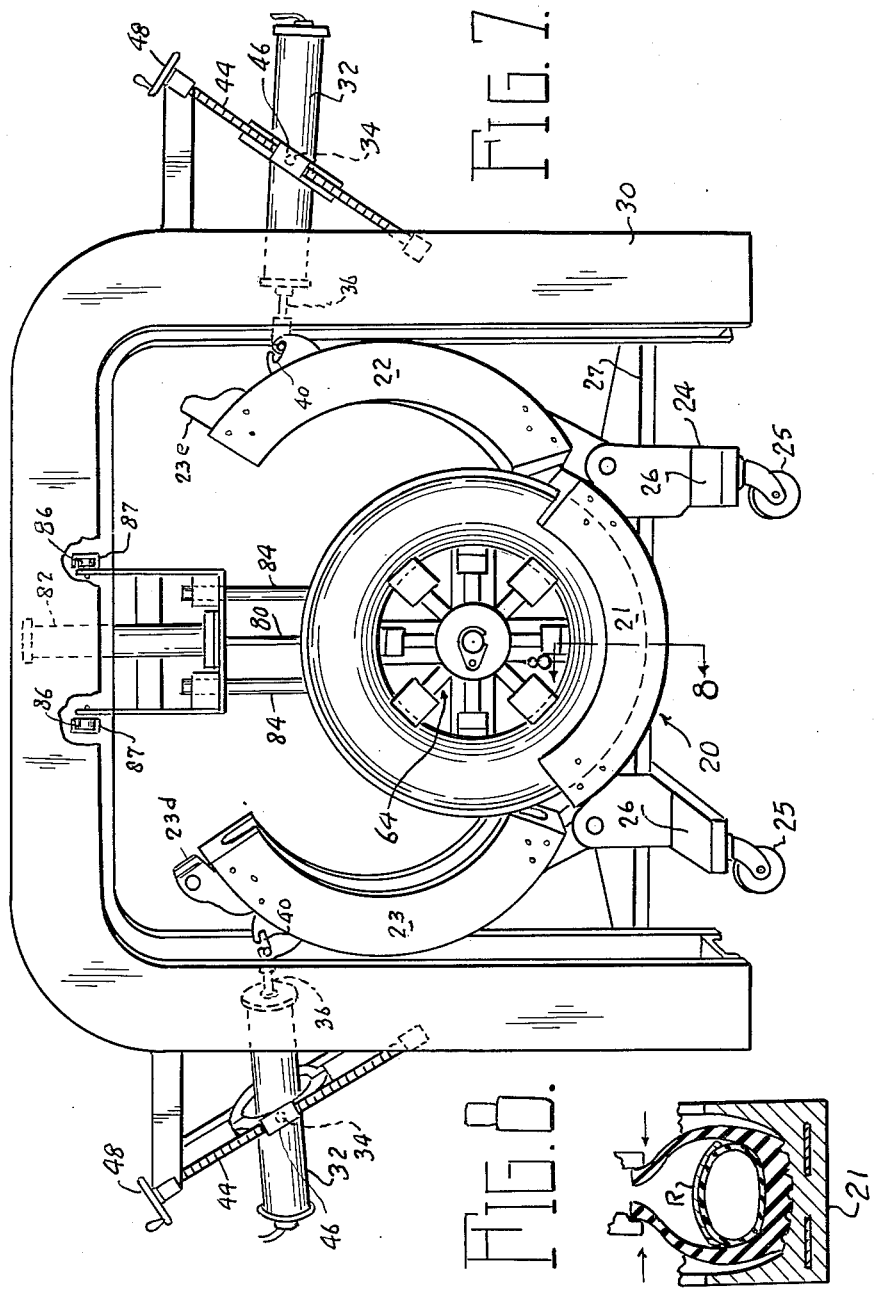
INVENTOR.
William Jack Laycox
BY
ATTORNEYS United States Patent Office 3,042,966
Patented July 10, 1962

3,042,966
APPARATUS FOR RETREADING TIRES
William Jack Laycox, Walnut Creek, Calif., assignor to Bacon American Corporation, Muncie, Ind., a corporation of Indiana
Filed Sept. 11, 1959, Ser. No. 839,377
1 Claim. (Cl. 18—2)

This invention relates to apparatus for retreading tires, and is particularly directed to a machine that is suitable for retreading heavy tires of the type commonly used on trucks and off-the-road vehicles.

In the copending application of Carlton Keith Barefoot, Serial No. 687,145 (now patent No. 2,903,742), owned by the assignee of the present application, there is disclosed an apparatus for retreading tires of lighter weight of the type commonly used on passenger cars. The apparatus therein disclosed employs a "clam-shell" mold comprising two similar halves which are closed around the tire during curing thereof. Such apparatus is difficult to use with heavier tires which require much deeper tread stock, for the reason that the increased thickness of the tread makes it difficult to insert and remove the tire from the mold.

The primary object of the present invention is to provide an apparatus including peripherally separable mold portions, together with means to load a prepared tire body into the mold sections in such a manner that the tire is compressed by its beads to reduce its diametral dimension and is, in addition, compressed against relatively stationary mold section during loading to reduce its radius in one direction.

Another object of the invention is to provide a machine which can be operated rapidly to load and unload heavy tires, and in which the curing of the retreading stock takes place at a location remote from the loading and unloading machine.

Still another object of the invention is to provide a machine which is capable of operating on tires of widely varying sizes from the smaller truck tires to the largest common size thereof.

Still another object of the invention is to provide an apparatus which may be operated by unskilled labor and which is virtually fool-proof in its action so that the loading and curing of tires therein results in a greatly improved product.

Other objects and advantages of the invention will become apparent from the following detailed description of a preferred embodiment thereof, reference being had to the accompanying drawings, in which—

FIG. 3 is a partial sectional view on line 3—3 of FIG. 1;

FIG. 4 is a fragmentary perspective view showing the bead aligning and tire compression mechanism;

FIG. 5 is a fragmentary perspective view showing a mold latch mechanism;

FIG. 7 is a view similar to FIG. 1 showing the second stage of a loading operation, the tire being compressed circumferentially by the bead aligning mechanism and being compressed radially by the loading mechanism; and FIG. 8 is a fragmentary sectional view taken on line 8—8 of FIG. 6, and indicating the forces acting on the tire during loading.

Figure 1:
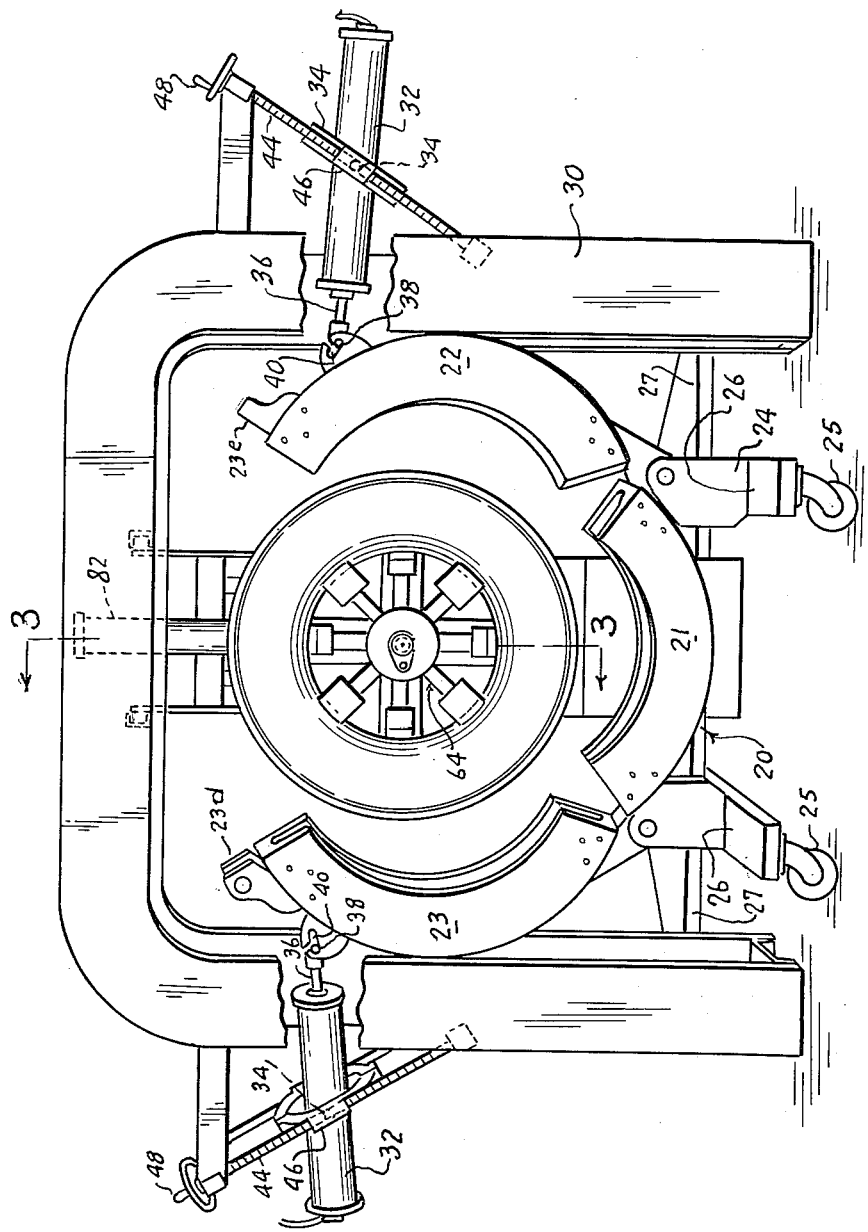
FIG. 1 is a diagrammatic front elevational view, with parts broken away, of a machine embodying the present invention, with a tire being shown in a position immediately prior to loading into a mold.

Referring to the drawings, and particularly to FIG. 1 thereof, the present invention is shown in the position in which a prepared tire is about to be loaded into a peripherally separable mold 20. The mold is of a type well known in the art and comprises a stationary lower section 21 and wing-like side sections 22 and 23 pivoted to the support for the lower section so that, when all of the sections are closed, a completely circular mold is formed. In the case of the present invention, the mold sections are carried on and form a part of a dolly 24 having casters 25 to make it easily manipulable.

Figure 2:
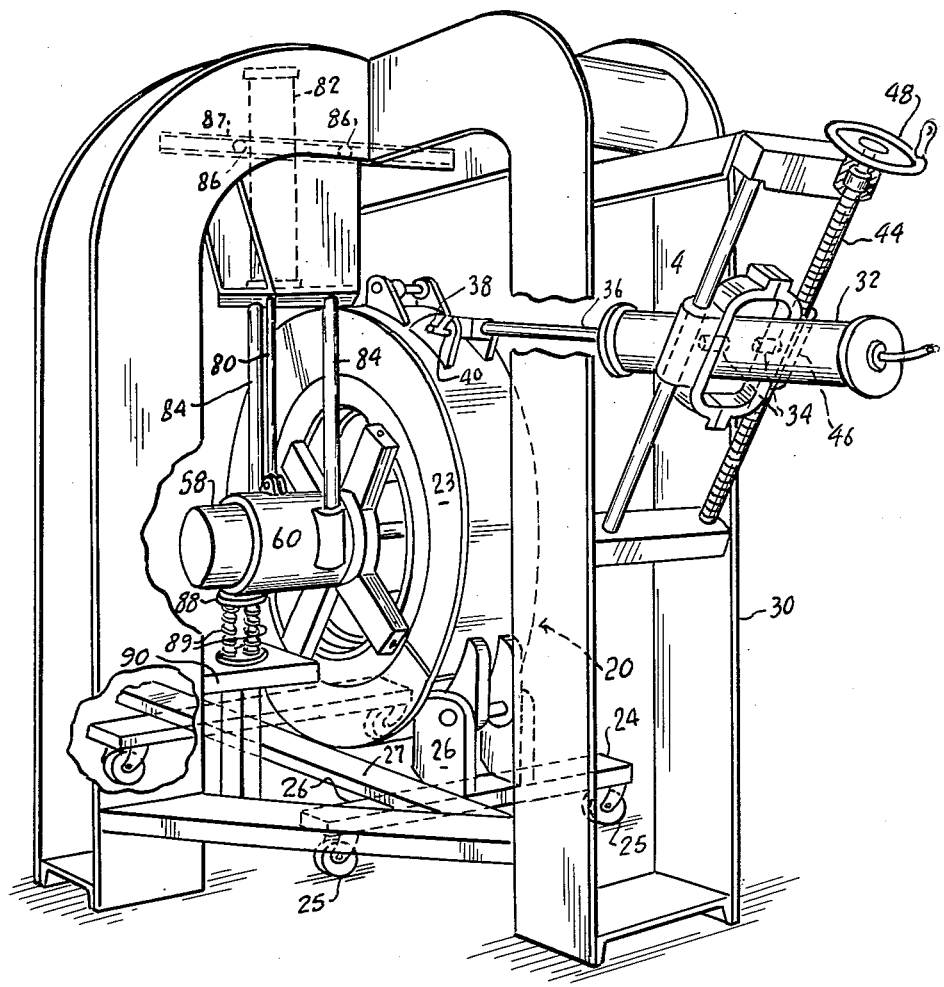
FIG. 2 is a perspective view taken from the rear of the machine, with parts broken away, showing a tire loaded into a mold, the parts being now ready for separation of the loaded mold from the loading machine.
Figure 6:
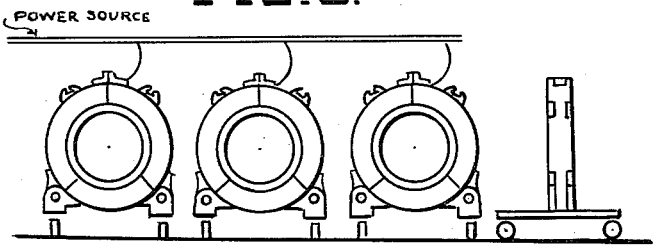
FIG. 6 is a schematic view showing a number of loaded molds in curing position.

The dolly, as shown in FIGS. 1 and 2, has two base legs 26 supported by the casters 25, and of an extent sufficient to underlie a cross frame member 27 when the dolly is in position to receive or discharge a tire.

The mold 20 contains the usual matrix sections which determine the tread design which will be put on the tire, and in accordance with normal practice the matrix sections are removable so that the tread design can be changed at the selection of the operator.

A mold clamping or latching mechanism is carried between the sections 22 and 23, a portion of the latch being carried by each of the peripherally separable sections so that the mold can be latched in the closed position after it is loaded. In the form shown in FIG. 5 the latch comprises a plate 63a adjustably carried on swinging bolts 23b which are pivoted to a shaft 23c mounted between lugs 23d on one of the movable mold sections. The plate 23a cooperates, in latching position, with lugs 23e on the other of the movable mold sections when it is swung to latching position and is tightened against the lugs 23e by nuts 23f.

The frame of the machine for loading the tire bodies into, and stripping the completed tires from, the mold 20 is shown best in FIGS. 1 and 2. The frame comprises generally an inverted U-shaped member 30 which is bolted or otherwise fixed to a suitable foundation so that it will remain stationary and steady. At each side, the frame 30 carries a power cylinder 32 which is mounted in trunnions 34. The piston rod from each of the power cylinders is designated 36 and each of the piston rods carries at its end a means to form a temporary attachment with one of the peripherally separable wing mold sections 22 or 23. The piston rods not only serve to open the molds from a completed tire but also serve to force the mold sections to closed position after a prepared tire body has been loaded into position and is ready for vulcanization. In the form shown, the piston rods each carry a pin member 38 which cooperates with a T-shaped slot 40 in the adjacent mold section. The pin 38 first enters the vertical portion of the T and then moves into the lateral portion of the slot 40, the direction of movement depending upon whether the mold is to be opened or closed. Obviously, movement into the portion of the slot 40 closest to the power cylinder 32 will cause the mold sections to move open while movement into the portion of the slot 40 remote from the power cylinder 32 will permit the pin 38 to contact the adjacent wall of the slot so that the piston will force the mold sections to closed position.

If desired, some means may be provided to adjust the vertical location of the trunnion 34, and this means may conveniently take the form of an elongated screw 44 cooperating with a drive nut 46 carried by the trunnion 34. The screw 44 is turned by an adjusting hand wheel 48 so that the trunnion may be moved up and down with relation to the frame 30. This adjustment may not be necessary if the range of sizes of tires to be loaded and unloaded by the machine is relatively restricted. In this instance, sufficient adjustment movement of the position of the cylinders 32 will be derived merely from their mounting in the trunnions 34 without resorting to the necessity of raising or lowering the point at which the cylinders are pivoted in their trunnions.

The present invention is particularly concerned with the means to load the tire into the peripherally separable mold. In this connection, the invention provides means to support a prepared tire body with an inside curing rim that has previously been placed in position in a manner well known in the art. Further, the invention comprises means to compress the tire beads and thus reduce the tire diameter, together with means to crowd the tire into the stationary lower mold portion 21 to reduce the dimension of the tire in a radial direction.

In the form shown, the means to support the prepared tire body is best shown in FIG. 4 and comprises four forwardly extending fingers 50 about which the tire is received, the fingers being carried by arms 52 in which they are adjustable radially by screws 53. The fingers are guided in their radial movement in slots 54 formed in the arms 52.

The tire supporting and centering fingers 50 are adjusted radially simultaneously in any suitable manner in order that they may fit within the center opening of tires of different sizes. Thus each of the screws 53 is provided at its lower end with a bevel gear 55 (FIG. 3) which engages a master ring gear 55a, journalled on a boss on a plate 55b fixed to the head of the bead compressing cylinder hereinafter described. A removable crank 55c is provided to cooperate with and to turn one of the screws 53. This motion will be imparted to the associated bevel gear and to the remainder of the bevel gears 55 by the master ring gear so that each of the screws 53 will be turned an equal amount, and the fingers 50 adjusted equally in or out depending on the direction of rotation of the adjusting crank.

Each of the radially adjustable fingers 50 is further provided with a pressure surface 56 which engages the bead of the tire that is toward the inside of the machine as hereinafter described.

The radially extending arms 52 and the centering fingers 50 are carried by a power cylinder 58 and are movable therewith. The power cylinder 58 is, in turn, carried by and fixed to a sleeve 60 (FIG. 3). A cooperating piston 62 having a projecting piston rod 63 is received in the power cylinder 58 and is provided at its forward end with a removable bead compressing spider 64. The spider 64 comprises four radially extending arms 66, each terminating in a pad or bead engaging surface 68 (FIG. 4). The spider and its integral radially extending arms, is removable from the piston rod 63 and is held thereon by any suitable latch member such as pivoted element 70 which cooperates with a latch slot 72 as best shown in FIGS. 3 and 4. When the latch is closed the member 70 engages behind the head of the piston rod which forms one wall of the slot 72, the head being designated 74 in FIG. 3. When the latch is released, by swinging it about its pivot, the spider or bead compressing member 64 may be slid manually away from the piston rod 63 to permit a supported tire body to be removed and replaced on the fingers 50.

With a prepared tire body on the supporting fingers 50, air may be admitted to the front of cylinder 58 from any suitable source through a pipe 76 and will drive the piston 62 back in the cylinder 58, closing the compressing spider 64 against the outside bead of the tire, and pinching the tire beads against the pressure surface 56 of the fingers 50 which stand against the rear bead of the tire. The beads will thus be forced together, and the tire diameter will be reduced accordingly, provided a rigid internal circumferential member, such as an inside curing rim R (FIG. 8) has been placed on the tire during its preparation. The use of inside curing rims is well known in the art, and while the bead compressing mechanism of the present invention will usually be used with such a rim, any other comparable rigid member may be substituted therefor during the mold loading and removed thereafter.

While the tire beads remain in their compressed condition by reason of the pneumatic pressure applied in cylinder 58, the entire supporting assembly is lowered by a force applied through a piston rod 80 driven by a piston 81 working in cylinder 82. The vertically movable assembly is guided by spaced rods 84 (FIGS. 3 and 7).

The entire bead compressing and tire supporting assembly is mounted for front-to-back movement on spaced rollers 86 which are guided in tracks 87 on the upper frame of the machine. The rollers are made very free-running so that the tire body, carried on the fingers 50 can be adjusted with respect to the plane of the mold and the plane of the tire made to center precisely with that plane. When the assembly has been positioned so that the center of the plane of the tire is over the center plane of the stationary matrix section 21 the "crowding" movement caused by the piston 81 will cause the prepared tire body to assume its desired centered location on the stationary mold section 21. The downward movement of the supporting assembly continues beyond the point where the center of the piston rod 63, or the center of the tire, coincides with the center of the mold. The tire is thus compressed in the lower stationary mold section 21, and is held under pressure by air in cylinder 82, the radial dimension of the tire being thus reduced in a vertical direction.

While the tire is held under compression in the lower stationary mold section 21, the side cylinders 32 are energized, and the mold sections 22 and 23 are moved in about their pivot points to the closed position as shown in FIG. 2. When the mold is closed about the tire, it is latched in position by closing the latch members, plate 23a against lugs 23e. At this point in the cycle, the air pressure may be relieved in cylinders 58 and 82 so that the tire is free to expand into the mold equally throughout its periphery. This expansion may, if desired, be aided by a spring pressed plate 88 (FIG. 2) against which the sleeve 60 bears when in its lowered position. The springs beneath plate 88 are designated 89 and are held between the plate and a stationary machine part 90. The springs 89, of course, oppose the downward force of the piston 80 during the crowding of the tire into the lower stationary mold section 26. Crowding of the tire into the lower mold section definitely assures that no "scalping" action of the unvulcanized rubber placed on the prepared tire body will be caused by the inward closing movement of the movable mold sections 22 and 23. In some instances, with larger matrices the crowding pressure can be released before the mold sections 22 and 23 are closed, and in this case the crowding movement is used only to make sure that the tire body is properly seated in the stationary mold section 21.

With the prepared tire body loaded into the mold and the mold locked, the pins 38 of the piston rods 36 can be removed from their T-slots, and the pistons retracted. The spider 64 is released from the end of piston rod 63 manually and the loaded mold can then be rolled on the dolly to the point where curing energy is available, either in the form of electrical energy in the case of an electrically heated mold, or steam power in the case of a steam heated mold. It will be seen that a number of molds can be loaded, rolled to a remote location and subjected to curing temperatures without tying up the expensive loading and unloading machine. In the case of truck tires, the normal curing cycle for retreading is in the order of 120 minutes to 180 minutes and in known machines, the entire apparatus is tied up for this period of time. In the case of the present invention, however, only the mold itself and its supporting dolly are required to be devoted to the job, and as many as twenty or thirty molds can be serviced by a single loading machine.

When the cycle of curing is complete, the dolly 24 and its supporting mold is returned to the press and the supporting fingers 50 are lowered to enter into the tire as the dolly is slid into place with its extending legs 26 under the cross frame member 27. The piston rods 36 are extended and the pins 38 pushed into the T-slots 40 on each of the movable mold sections 22 and 23. The wing mold latch mechanism is released and actuation of the cylinders 32 will cause the mold sections 22 and 23 to open to the position shown in FIG. 7. The cylinder 82 is now used as a lifting cylinder and serves to strip the tire from the lower stationary mold section 21, the reaction force being taken through the extended base or legs 26 of the dolly to the base cross frame member 27. When the tire has been raised from the mold, to the position shown in FIG. 1, for example, the entire tire supporting assembly including the fingers 50, the bead compressing cylinder 58 and the cylinder 82 can be rolled forward on rollers 86 and tracks 87 to a point where the plane of the tire has completely cleared the mold. The cylinder 82 can now be used to lower the tire nearly to ground level, and the tire slid forwardly off the fingers 50 manually. The cured tire body is then replaced with another prepared tire body consisting of a suitably prepared carcass and a surrounding strip or band of unvulcanized rubber which extends down over the tire shoulders for a full retreading operation.

The prepared tire body, once it has been received on the fingers 50 is then held in place by the operator manually mounting the spider 64 over the end of the piston rod and latching it in place by the latch member 70. The tire receiving assembly comprising fingers 50, the bead compressing cylinder 58 and the stripping cylinder 82 is then raised, pushed back on rollers 86 to bring the center plane of the prepared tire body to about the center plane of the mold. The bead compressing cylinder 58 is then actuated to compress the tire beads as above described, which reduces the tire diameter so that the prepared carcass will easily enter the mold. The operation of crowding the tire downwardly by actuating cylinder 82 to reduce its radial dimension by forcing it into the stationary mold section 21 is then repeated, the wing sections of the mold 22 and 23 are closed, the pressure is taken off of the air cylinders 58 and 82, and the loaded mold is then again removed from the machine to the point of curing.

While the invention has been described in conjunction with a specific form and disposition of the parts, it should be expressly understood that numerous modifications and changes may be made therein without departing from the scope of the appended claim.

What I claim is:

Apparatus for retreading tires comprising a dolly, a circular tire mold mounted on and supported by said dolly, said mold having an arcuate stationary mold section, arcuate wing sections pivotally connected to the ends of said stationary section, and a latch to hold said wing sections in closed position, a machine for loading and unloading said mold including a stationary frame providing an operative position for molds brought thereto, releasable tire-engaging means insertable through an open center of a prepared tire body to engage the rim beads of the tire body to support the tire body in a plane parallel to the plane of said mold, means connected to said engaging means for moving said engaging means in a plane parallel to the plane of said mold to insert a portion of the tire body into said stationary mold section and to move the tire body further into a crowded position in which the center of the tire body is displaced radially from the axis of the mold toward said stationary mold section, means supported by said frame for laterally moving said engaging means and said moving means toward and away from the plane of the mold, power-actuated means mounted on said frame, means for connecting said power-actuated means to said mold wing sections for swinging said wing sections into a closed position around the tire body when the body is brought into the crowded position by said parallel moving means and said lateral moving means, and resilient means aligned with said parallel moving means and positioned to urge said tire-engaging means from its crowded position to a center position in which the axis of the tire body is aligned with the axis of said mold.

References Cited in the file of this patent

UNITED STATES PATENTS

| | | |
|---|---|---|
| 2,516,715 | Moore | July 25, 1950 |
| 2,866,228 | French | Dec. 30, 1958 |
| 2,872,704 | Schaevitz | Feb. 10, 1959 |
| 2,928,119 | Fassero et al. | Mar. 15, 1960 |

FOREIGN PATENTS

| | | |
|---|---|---|
| 162,713 | Australia | Oct. 15, 1953 |